United States Patent Office 3,124,622
Patented Mar. 10, 1964

3,124,622
PRODUCTION OF OLEFINS FROM ALDEHYDES AND ACETYLENES
Norbert F. Cywinski, Bartlesville, Okla., assignor to Phillips Petroleum Company, a corporation of Delaware
No Drawing. Filed May 22, 1961, Ser. No. 111,503
7 Claims. (Cl. 260—682)

This invention relates to the formation of olefins from lower molecular weight reactant materials. In accordance with one aspect, this invention relates to a process involving a condensation reaction for the production of olefins from aldehydes and acetylenes.

Various processes are known for the production of olefins from lower molecular weight materials. Some of these known processes employ catalysts while others are purely thermal. However, many of the known processes have various disadvantages for one reason or another. For example, some of these processes require high temperatures, others require expensive catalysts, while still others require expensive and difficult-to-produce reactants. Thus, it can be safely said that there is still considerable room for improvement in the production of these materials, especially with respect to the provision of a process wherein readily available reactants can be used for the production of valuable olefin products.

The present invention relates to a novel process for the production of olefins by the condensation of aldehydes and acetylenic compounds in the presence of an initiator.

Accordingly, an object of this invention is to provide a novel process for the production of olefins. Another object of this invention is to provide a process for the condensation of aldehydes and acetylenes. It is a further object of this invention to provide a free radical initiated process for producing olefins by condensation of acetylenes and aldehydes. Other aspects, objects, and advantages of the invention will be apparent to those skilled in the art in view of this disclosure.

According to the invention, I provide a novel process for the production of olefins which comprises contacting an alkyl aldehyde having at least 2 carbon atoms per molecule with an acetylenic material selected from the group consisting of acetylene and alpha-alkynes containing from 3 to 5 carbon atoms per molecule under reaction conditions of temperature and pressure in the presence of a free radical initiator, and recovering the olefin product thus produced.

The alkyl aldehyde reactants that can be used in the practice of the invention have at least 2 carbon atoms per molecule and can be open or branched chain aldehydes. In these instances where a branched chain aldehyde containing a tertiary carbon atom is used, the hydrogen atom of the aldehyde group is more reactive than the hydrogen atom of said tertiary carbon atom. Thus, the process of the invention is highly selective to reaction at the hydrogen of the aldehyde group. Although there is no critical upper limit as to the molecular weight of the aldehyde reactant, generally aldehydes containing from 2 to about 15 carbon atoms per molecule are used.

Representative examples of suitable alkyl aldehydes that can be used in the practice of the invention include, among others, the following: acetaldehyde; butyraldehyde; pivaldehyde; isovaleraldehyde; pentanal; hexanal; octanal; hendecanal; 3-methyldecanal; dodecanal; tridecanal; pentadecanal; and the like.

The acetylenic materials that can be used in the practice of the invention include acetylene itself and the alpha-acetylenes (alkynes) containing from 3 to 5 carbon atoms per molecule. Representative examples of suitable alpha-acetylenes include methylacetylene, ethylacetylene, n-propylacetylene, and the like. When acetylene itself is used as the acetylenic material, the olefin products obtained are terminal or 1-olefins and the reaction is selective to the production of said terminal or 1-olefins. However, since the substituted acetylenes can react at 2 points on the chain, complete selectivity as to olefin type is not achieved when said substituted acetylenes are used. However, olefins are produced in either event.

As indicated above, the condensation reaction of the aldehydes and acetylenes according to the invention is carried out in the presence of a free radical initiator. Any suitable free radical initiator which decomposes at usable rates under the reaction conditions to furnish free radicals can be used in the practice of the invention. Suitable initiators for furnishing free radicals are organic peroxide and azo compounds which have half lives in the range of 0.05 to 50, preferably 0.05 to 20, hours under reaction conditions. Representative examples of suitable free radical initiators include, among others, the following: di-tert-butyl peroxide; tert-butyl hydroperoxide; benzoyl peroxide; azobisisobutyronitrile; tert-butylbenzene hydroperoxide; dicumyl peroxide; hydroxyheptyl peroxide; cyclohexanone peroxide; t-butyl peracetate; di-t-butyl diperphthalate; t-butyl perbenzoate; methyl ethyl ketone peroxide; p-menthane hydroperoxide; pinane hydroperoxide; 2,5 - dimethylhexane-2,5-dihydroperoxide; cumene hydroperoxide; and the like.

Also, according to the invention, actinic or chemically active rays such as ultraviolet can be employed in conjunction with the free radical initiators to increase the reaction rate and reduce the temperature and/or time requirement for equivalent conversion. Ultraviolet, for example, assists in starting free radical formation.

Although the reaction mechanism of the invention has not been fully established, the results obtained are consistent with a free radical chain mechanism. This is illustrated below using acetylene and a general symbol

for the aldehyde:

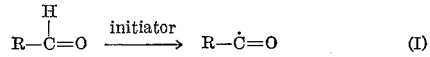   (1)

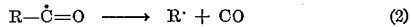   (2)

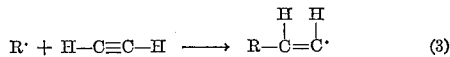   (3)

   (4)

The free radical produced in reaction (4) can then repeat the sequence starting with reaction (2). The chain is eventually broken by two free radicals R·, uniting or by a chain-terminating impurity. Thus, a finite amount of initiator is required.

The reaction conditions of temperature, pressure, time, etc., can vary appreciably depending upon the particular reactants and initiators employed. However, in general the reaction temperature ranges from about 0 to about 200° C., and the reaction pressure is ordinarily sufficient to maintain a liquid phase. However, a vapor phase reaction system can be used. Reaction time varies inversely with temperature and ordinarily ranges from about 0.1 to 100 hours or more, with 1 to 50 hours being usually preferred. As indicated above, the use of ultraviolet light in conjunction with the free radical initiator increases the reaction rate and reduces temperature and/or time requirement for equivalent conversion.

The ratio or amounts of the reactants and initiator employed can vary appreciably. However, best results are obtained by employing a molar excess of aldehyde to the acetylenic material. Said molar excess will ordinarily be at least 2:1, preferably at least 5 to 1. A molar excess of more than 20 to 1 is seldom practical. The amount of initiator present ordinarily ranges from about 1 to 100 mole percent of the acetylenic material charge.

Numerous variations in operative procedure can be employed. The process of this invention can be carried out as a batch process, for example, by charging the reactants into a reactor (autoclave) containing an initiator. Although any suitable charging procedure can be used, the aldehyde is generally charged first followed by the initiator and acetylenic compound. Also, if desired, the present process can be carried out in a continuous manner. Apparatus suitable for carrying out the processes of the invention will be known to those skilled in the art. Any suitable apparatus can be employed.

It is desirable to keep the reaction system as free of chain terminating components as practicable since the condensation reaction appears to be a chain reaction once it is initiated. Such undesirable materials include mercaptans, quinones, and the like. It is highly desirable, therefore, that the feed components or reactants be freed of these materials as well as other materials which may tend to inhibit the reaction. Any of the known means for removing such contaminants can be used. High feed purity with respect to these undesirable chain terminating components produces higher yields of product based on the initiator.

At the completion of the condensation reaction, the total reaction mixture can be subjected to any suitable known separation procedure, e.g., distillation, extraction, etc., for recovering the olefinic product and unreacted reactants that may be present.

The olefin hydrocarbon products produced in accordance with the present invention have wide utility in the chemical industry. For example, olefins have wide utility as reactants in the various polymerization processes recently developed. The olefins produced in accordance with the invention can also be hydrated to the corresponding alcohols.

The following example will serve to further illustrate the invention.

*Example*

A run was carried out in which n-butyraldhyde was reacted with acetylene in the presence of di-tert-butyl peroxide to form 1-pentene.

In this run 3 gram moles of n-butyraldehyde and 0.05 gram mole of di-tert-butyl peroxide were charged to a 1-liter rocking autoclave. The autoclave was flushed with nitrogen to remove all air. The autoclave and contents were then heated to about 121° C. and nitrogen was then added to a pressure of 150 p.s.i.g. The autoclave was then pressured to 250 p.s.i.g. with acetylene.

The autoclave was maintained at about 121° C. for a reaction period of about 24 hours, with rocking. During this time the total pressure increased to 400 p.s.i.g., the increase being substantially due to the formation of carbon monoxide. At the end of said reaction period the autoclave was cooled to room temperature (70–75° F.) and the gas phase vented. Analysis of the remaining liquid reaction mixture by gas chromatography showed that a yield of 2.3 grams of 1-pentene was obtained, this being 0.62 mole per mole of di-tert-butyl peroxide.

The usual precautions for handling acetylene under pressure should be observed. Explosions can be prevented in handling acetylene under pressure by dilution with other gases (nitrogen, methane, etc.), operating with limited free space in the lines and vessels in which acetylene is under pressure, and other means known in the art for handling acetylene.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. A process for the production of olefins which comprises reacting an alkyl aldehyde containing at least 2 carbon atoms per molecule with an acetylenic material selected from the group consisting of acetylene and alpha-alkynes containing from 3 to 5 carbon atoms per molecule in the presence of a free radical initiator selected from the group consisting of organic peroxide and organic azo compounds having a half-life within the range of 0.05 to 50 hours under reaction conditions of temperature and pressure, and recovering the olefin product thus produced by said reaction.

2. A process for the production of olefins which comprises condensing an alkyl aldehyde containing at least 2 carbon atoms per molecule with an acetylenic material selected from the group consisting of acetylene and alpha-alkynes containing from 3 to 5 carbon atoms per molecule by contacting said aldehyde and said acetylenic material in the presence of a free radical initiator selected from the group consisting of organic peroxide and organic azo compounds having a half-life within the range of 0.05 to 50 hours at a temperature in the range of about 0° to about 250° C., and a pressure sufficient to maintain a liquid phase, and recovering olefins thus produced by said condensation as product of said process.

3. A process according to claim 2 wherein said contacting is carried out in the presence of ultraviolet light.

4. A process for the production of olefins which comprises reacting an alkyl aldehyde containing from 2 to 15 carbon atoms per molecule with acetylene at a temperature in the range of 50 to 200° C. and a pressure sufficient to maintain a liquid aldehyde phase in the presence of di-tert-butyl peroxide, and recovering the olefins thus produced by said reaction.

5. A process according to claim 4 wherein said aldehyde is n-butyraldehyde and said product comprises 1-pentene.

6. A process for the production of olefins which comprises: reacting in a reaction zone an alkyl aldehyde containing from 2 to 15 carbon atoms per molecule with an acetylenic material selected from the group consisting of acetylene and alpha-alkynes containing from 3 to 5 carbon atoms per molecule, said aldehyde and said acetylenic material being present in said reaction zone in a mol ratio of aldehyde to acetylenic material within the range of 2:1 to 20:1, said reaction being carried out at a temperature within the range of from 0 to 250° C., under a partial pressure of acetylenic material within the range of from 0.1 to 20 atmospheres, and in the presence of a free radical initiator selected from the group consisting of organic peroxide and organic azo compounds having a half life within the range of 0.05 to 50 hours under said reaction conditions; and recovering the olefin product thus produced by said reaction.

7. A process according to claim 6 wherein said aldehyde is n-butyraldehyde, said acetylenic material is acetylene, said free radical initiator is di-tert-butyl peroxide, and said olefin product is 1-pentene.

References Cited in the file of this patent

UNITED STATES PATENTS

| 2,396,217 | Vaughan et al. | Mar. 5, 1946 |
| 2,552,980 | Ladd et al. | May 15, 1951 |

OTHER REFERENCES

Advanced Organic Chemistry by G. W. Wheland, chapter 15, p. 704, John Wiley and Sons, Inc., N.Y., 1949.

S. Murahashi: Synthesis of the Side Chain (9-position) of Plasmochin and Atebrin, Chemical Abstracts, volume 45, column 10, 197e, 1951.

Free Radicals by A. F. Trotman-Dickenson, chapter 1, pp. 8–9, John Wiley and Sons, Inc., N.Y., 1959.